(12) United States Patent
Gelbart

(10) Patent No.: US 6,957,773 B2
(45) Date of Patent: Oct. 25, 2005

(54) HIGH-SPEED FLATBED SCANNER

(75) Inventor: Daniel Gelbart, Vancouver (CA)

(73) Assignee: Creo Inc., Burnaby (CA)

( * ) Notice: Subject to any disclaimer, the term of this patent is extended or adjusted under 35 U.S.C. 154(b) by 219 days.

(21) Appl. No.: 10/440,235

(22) Filed: May 19, 2003

(65) Prior Publication Data

US 2004/0004122 A1  Jan. 8, 2004

Related U.S. Application Data

(60) Provisional application No. 60/381,091, filed on May 17, 2002.

(51) Int. Cl.[7] .............................................. G06K 7/10
(52) U.S. Cl. ...................... 235/454; 382/151; 382/313; 382/300; 356/474; 356/239
(58) Field of Search ........................ 235/454; 382/151, 382/313, 300; 358/300, 496, 474; 356/239, 356/474

(56) References Cited

U.S. PATENT DOCUMENTS

| | | | | |
|---|---|---|---|---|
| 4,700,238 A | * | 10/1987 | Sugiyama | 358/300 |
| 4,764,815 A | * | 8/1988 | Landsman | 358/496 |
| 6,389,183 B1 | * | 5/2002 | Han | 382/313 |
| 2002/0122109 A1 | * | 9/2002 | Ehsani et al. | 347/240 |
| 2002/0131632 A1 | * | 9/2002 | Vernackt | 382/151 |

\* cited by examiner

*Primary Examiner*—Jared J. Fureman
*Assistant Examiner*—Allyson N Trail
(74) *Attorney, Agent, or Firm*—Oyen Wiggs Green & Mutala LLP

(57) ABSTRACT

A fast scan axis for a high speed flat bed scanner has an elongated reciprocating table for securing the material to be scanned. The table is narrower than the material and portions of the material overhang the table. The overhanging portions are supported by stationary support surfaces with a plurality of air ports in the surface thereof for providing an air bearing support for the overhanging portions. The moving mass of the scanner is thus kept small enabling fast scanning of the material.

31 Claims, 4 Drawing Sheets

HIGH-SPEED FLATBED SCANNER

RELATED APPLICATIONS

This application claims benefit of the filing date of U.S. application Ser. No. 60/381091 filed on May 17, 2002.

TECHNICAL FIELD

The invention relates to the field of optical scanning and more particularly to scanning flat materials having at least one relatively flat surface.

BACKGROUND

Industrial scanners are commonly used to scan surface(s) of a material for the purpose of altering or inspecting the surface. Such alteration may involve patterning of the surface using selectively applied laser radiation to deposit material from a donor sheet and/or to change or remove a layer coated on the surface. In many applications, there is a requirement to scan the surface of a material in a rectilinear fashion and when the material is a relatively flat sheet, a flat bed scanner is commonly used. Specific example applications of flat bed scanning include fabrication of flat panel displays, printed circuit boards and printing plates. The material having the surface to be scanned is placed on a table, and the table is moved rapidly back and forth underneath an optical scanning head to scan the surface along a first axis. To complete the scan of the surface, motion along a second axis orthogonal to the first axis may also be necessary depending on the configuration of the optical scanning head. This may be achieved by moving the table or by moving the optical scanning head in a direction aligned with the second orthogonal axis.

When the surface being scanned is large, the mass of such a table and the inertial forces involved in creating the relative motion between the table and the optical scanning head may become prohibitive. Prior art scanners, such as that disclosed in PCT application WO 00/49563, have sought to address this problem by supporting the material having the surface to be scanned on rollers. The scanning speed of such systems is limited by the inertia of the rollers, since the rollers still have to change direction each time that the scan direction is reversed. Additionally, the use of moving parts that can wear is undesirable in circumstances where the material must be scanned or otherwise processed in extremely clean environments. Other disadvantages of rollers include deformation caused by contact between the material and the plurality of rollers, which contact the material at a plurality of points. Continuous support is important in cases where downward pressure is applied to the material by, for example, a donor material sheet in intimate contact with the material surface.

SUMMARY OF THE INVENTION

In a first aspect of the present invention, a fast axis scan apparatus used in a high speed scanner for scanning a flat material is provided. The scan apparatus has an elongate table that is adapted to be driven in a reciprocating manner in a direction aligned with the fast axis. The table has a chuck for securing the material to the table such that at least a portion of the material laterally overhangs the table. There is a stationary support surface for each overhanging portion of the material. The stationary support surface is disposed substantially parallel to the overhanging material and has a plurality of air ports for providing air bearing flotation to the overhanging material portions.

In another aspect of the present invention, a method for scanning a flat material in a fast scan direction is provided. The method has the following steps:
(a) clamping the material over only a portion of its surface area so that there is at least one overhanging portion;
(b) supporting the at least one overhanging portion using an air bearing surface;
(c) scanning the material in the fast scan direction by moving it back and forth in a reciprocating manner.

For an understanding of the invention, reference will now be made, by way of example, to the following detailed description in conjunction with the accompanying drawings.

BRIEF DESCRIPTION OF THE DRAWINGS

In drawings which illustrate by way of example only preferred embodiments of the invention.

DESCRIPTION

Figure 1:
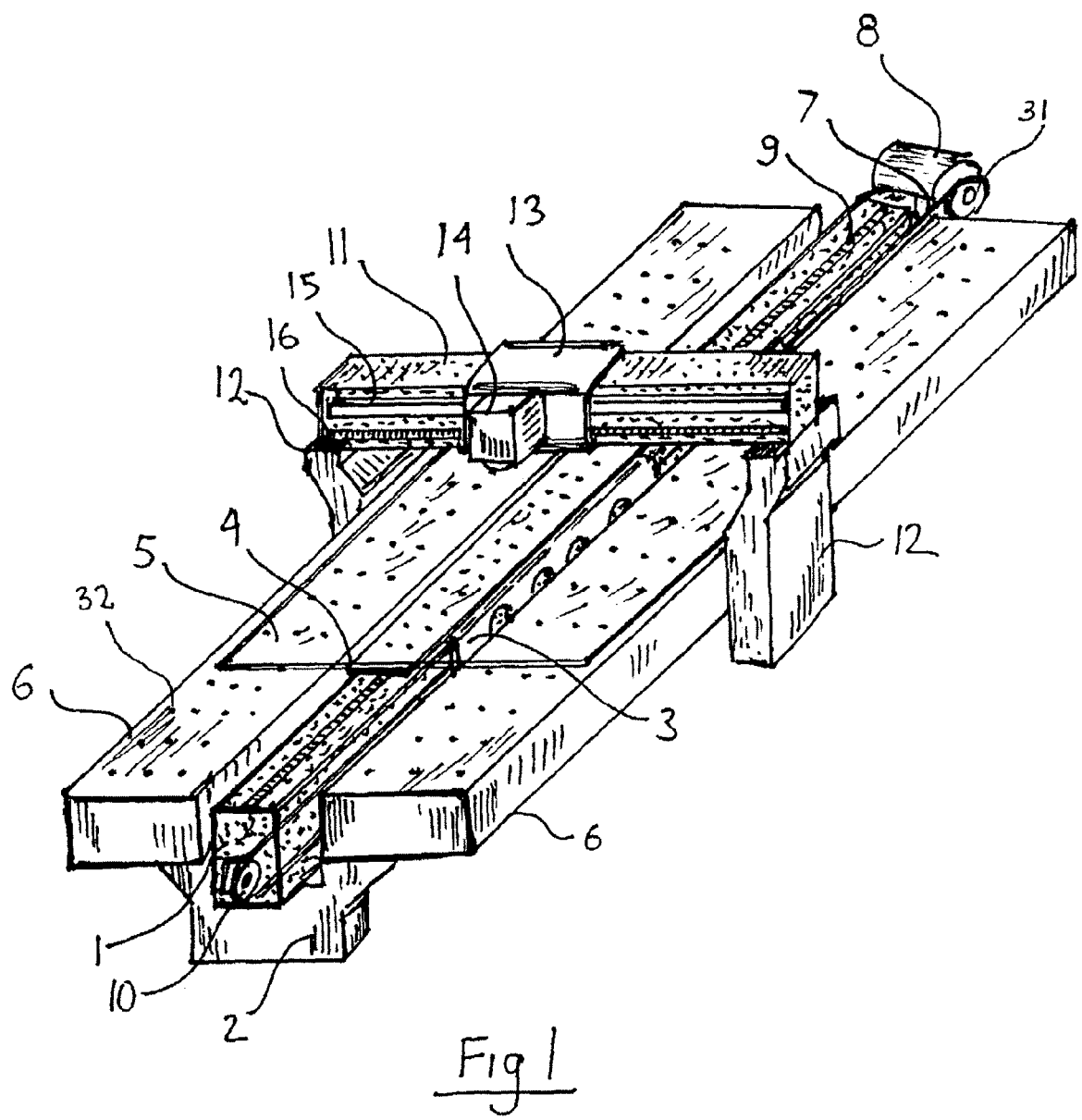
FIG. 1 is a perspective view of a flatbed scanner according to the present invention.

FIG. 1 shows a flatbed scanner in accordance with a particular embodiment of the present invention which is suited for patterning a glass substrate used in the fabrication of flat panel displays (FPD). A main beam 1 is mounted at its ends on a pair of supports 2 (only one of which is visible in the drawing of FIG. 1). As described in more detail below, table 3 is supported for sliding motion on beam 1 using air bearings. Table 3 comprises a vacuum chuck 4 on its upper surface. Vacuum chuck 4 provides vacuum suction which holds a material 5 in a fixed orientation on the surface of vacuum chuck 4. In the illustrated embodiment, material 5 is a sheet of glass. Vacuum chuck 4 supports and holds a central portion of material 5 while laterally overhanging portions of material 5 are supported by a pair of stationary air bearing support surfaces 6.

Air bearing support surfaces 6 comprise a plurality of air ports 32 which expel pressurized air (or other gas) to provide an air bearing (i.e. an air gap) for contactless flotation of the laterally overhanging portions of material 5. In this manner, air bearing support surfaces 6 help to support and maintain the substantially flat orientation of material 5 during scanning, while avoiding direct contact with material 5. The air channelled between material 5 and air bearing surfaces 6 also provides a retaining force which tends to maintain the alignment of material 5 above air bearing surfaces 6.

One or more endless belts 7 extend between and are entrained over pulleys 10 and 31. Motor 8 is driveably coupled to pulley 31 such that rotational motion of a shaft of motor 8 causes corresponding linear motion of belt 7. Belt 7 is attached to table 3, and under actuation from motor 8, imparts longitudinal reciprocating motion thereto. In this description the direction parallel with the longitudinal reciprocating motion of belt 7 is referred to as the "fast scan axis" and the orthogonal direction is referred to as the "cross scan axis". The drive mechanism incorporating motor 8, belt 7 and pulleys 10, 31 is advantageous because it is simple and cost effective, it keeps the heat generated by motor 8 outside the high accuracy scanning areas and it involves a small number of moving parts whose collective mass is relatively small when compared to the mass of the moving parts in alternative drive mechanisms.

The components driven by motor 8 comprise mainly table 3, vacuum chuck 4, material 5, belt 7 and pulleys 10, 31. These components have a collective mass which is small in comparison to the mass of moving parts in alternative drive mechanisms. The attachment (not shown) of belt 7 to table 3 is preferably positioned as close as possible to the center of gravity of table 3, which reduces torque imparted on table 3, thus helping to prevent rotational errors.

The position of table 3 (and material 5) along the fast scan axis of the scanner is indicated by a linear encoder 9. Linear encoder 9 preferably comprises an adhesive tape scale, with a corresponding read-head (not shown). Examples of such linear encoders include Thox™, manufactured by Renishaw of Gloucestershire, U.K. Using encoder 9 as a reference, the reciprocating motion of table 3 (and materials) along the fast scan axis need not be absolutely uniformly applied. Encoder 9 may provide synchronization to the writing or reading operation. This synchronization removes constraints from the belt drive system which allows, for example, some stretching under load. Drive electronics and motors are known to those skilled in the art and are commercially available from suppliers such as Anorad (USA), Fanuc (Japan), Siemens (Germany) and others.

Crosswise scanning (i.e. along the cross scan axis) is provided by sleeve 13 which is slideably mounted on air bearing beam 11. Air bearing beam 11 comprises a plurality of apertures which provide an air bearing that supports sleeve 13 above the surface of beam 11. Air bearing beam 11 spans the cross scan width of material 5 and is supported on either side of material 5 by supports 12. Supports 12 maybe coupled to beam 1 via a machine base (not shown).

An optical scanning head 14 is attached to sleeve 13. In one embodiment of the invention, optical scanning head 14 comprises a multi channel thermal laser imaging head along with a CCD camera which may be used, for example, for locating registration indicia on material 5. An example of a suitable optical scanning head 14 is the Squarespot™ thermal imaging head manufactured by Creo Inc. of Burnaby, British Columbia Canada.

Unlike the fast scan axis which incorporates linear encoder 9 to provide synchronization and to ease the associated actuation accuracy requirements, cross scan motion of sleeve 13 and optical scanning head 14 may require more precise position control. In the illustrated embodiment, the cross scan motion of sleeve 13 and optical scanning head 14 is controllably actuated by linear motor 15 in a closed-loop fashion, using linear encoder 16 for position feedback. Controllable linear motion systems, such as the one used to controllably actuate sleeve 13 and optical scanning head 14, complete with encoder, motor and drive electronics are widely available and well known to those skilled in the art.

Figure 2:
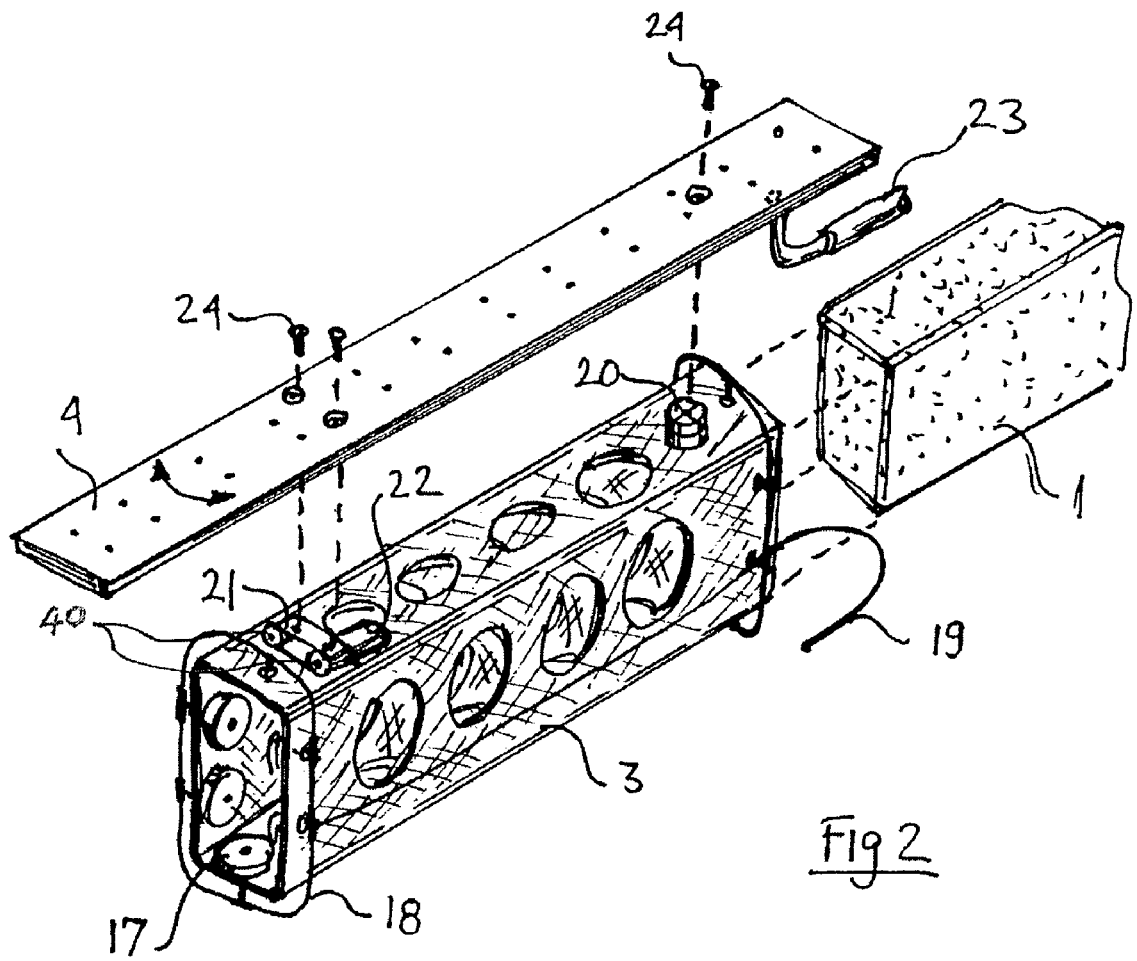
FIG. 2 is an exploded view of the vacuum chuck, moving table and a portion of the main beam of the scanner of FIG. 1.

Details of the coupling of table 3 to beam 1 and vacuum chuck 4 are shown in the exploded view of FIG. 2. Table 3 is preferably made from material having high specific stiffness, such as carbon-fiber based composite material for example. Carbon-fiber based materials have the advantage of allowing the tailoring of the material thermal expansion coefficient to thermally match the other parts of the system and the material being scanned. Such balancing of thermal coefficients of expansion is well known in optical systems where a degree of thermal invariance is desired. Carbon-fiber based materials may be fabricated to have a target co-efficient of thermal expansion that may very small or even be negative.

Table 3 is equipped at each end with a plurality of air bearing pads 17 which surround beam 1. In a preferred embodiment, twelve air bearing pads 17 are used, six at each end of table 3. Only three air bearing pads are visible in FIG. 2.

Figure 3:
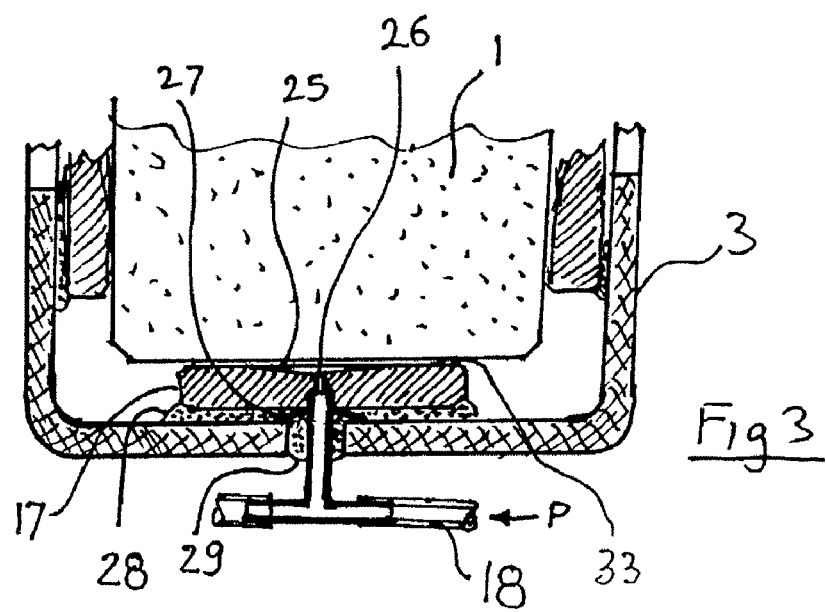
FIG. 3 is a partial cross-sectional view of the air bearing and main beam of the scanner of FIG. 1.

Air bearing pads 17, shown in more detail in FIG. 3, are preferably made of aluminium. Each pad 17 comprises a flat annular shaped portion 33, a shallow recess 25 and a flow restrictor aperture 26. Apertures 26 of pads 17 are fed by an air (or other gas) distribution system 18. Pads 17 are sized to cover almost the full width of beam 1 on each of its faces. In the illustrated embodiment, pads 17 are sized such that a single pad 17 covers the top face of beam 1, a single pad 17 covers the bottom face of beam 1 and pairs of pads 17 cover the side faces of beam 1.

As an example, for a 100 mm×200 mm cross-section beam the diameter of each pad may be about 80 mm, the thickness about 8 mm, and shallow recess 25 may be a slight taper with an outside diameter of about 40 mm and a central depth of about 0.025 mm. Flat portion 33 of each pad 17 is preferably lapped to correspond to the flatness of beam 1. Restrictor aperture 26 of each pad 17 is about 0.5 mm in diameter and about 2 mm long. A secondary taper or countersink (not shown) with an outside diameter of about 3 mm may be provided at the periphery of aperture 26, as a transition between recess 25 and aperture 26. The outer peripheral edges of each pad 17 at the edges of flat portion 33 may be chamfered. In this example embodiment, the thickness of pads 17 is about 1 mm less than the desired operating gap between table 3 and beam 1.

For each pad 17, a spring washer 27 may be inserted in this gap to press pad 17 towards beam 1 during assembly of table 3. Low shrinkage epoxy resin 28 may then be injected via aperture 29 to fill the gap and secure the pads 17 in correct alignment with beam 1.

Vacuum chuck 4 is preferably mounted to table 3 in a manner which allows a small range of rotational adjustment. Such rotational adjustment permits alignment of the reciprocating scanning motion along the fast scan axis with registration marks on material 5. The small rotational adjustment, typically below 5 mrad, is preferably provided by one or more flexure joints located between chuck 4 and table 3. Flexure and rolling motions minimize the generation of particulate matter and, consequently, are preferred over contact sliding in applications requiring a high degree of cleanliness such as FPD fabrication.

In the illustrated embodiment of FIG. 2, one end of chuck 4 is mounted on a rotational flexure pivot 20 on table 3 using fastener 24. The other end of chuck 4 rests on or is secured by fasteners 24 to a band 21. Band 21, which may be made of steel for example, extends between a pair of rollers 40, one of which is actuated by a gear motor 22. In this manner, gear motor 22 may be activated to move one end of chuck 4, such that chuck 4 may be rotated slightly about flexure pivot 20.

Figure 4:
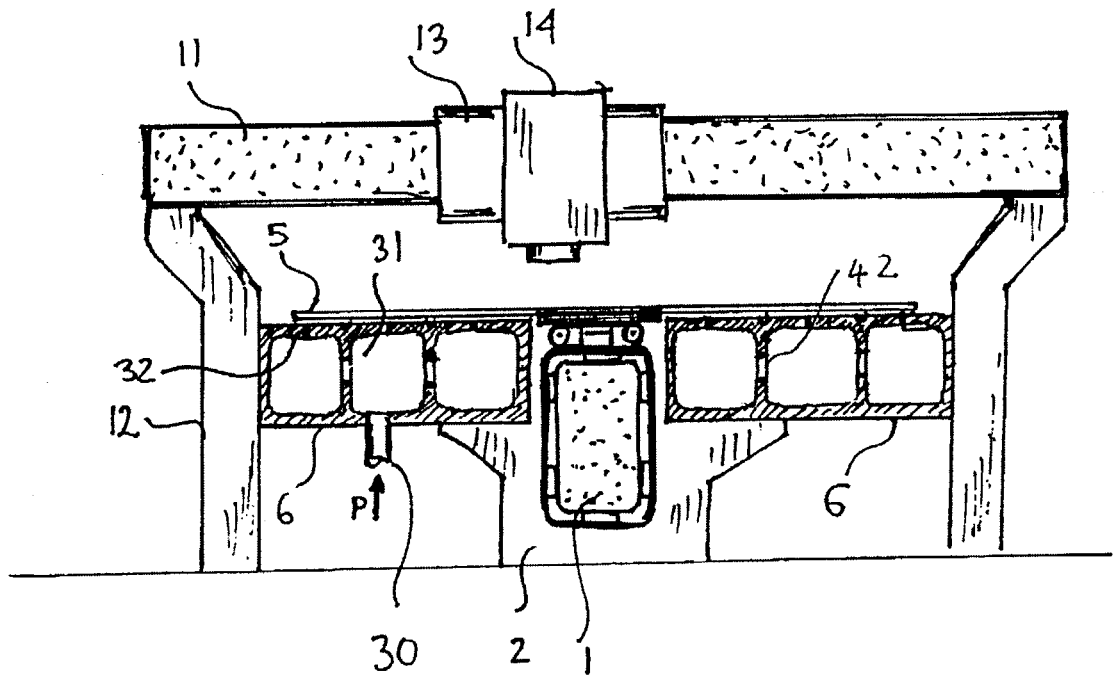
FIG. 4 is a cross-sectional view of the scanner of FIG. 1.

Referring now to FIG. 4, air bearing support surfaces 6 preferably comprise a honeycomb or hollow construction, allowing air (or other gas) to be supplied via inlet port 30 and to escape via outlet ports 32. The interior structure of air bearing support surfaces 6 may be divided into chambers 31 and inter-connected via apertures 42. Such a construction helps to prevent the internal pressure of air (or other gas) distorting the upper air bearing support surfaces.

Figure 5:
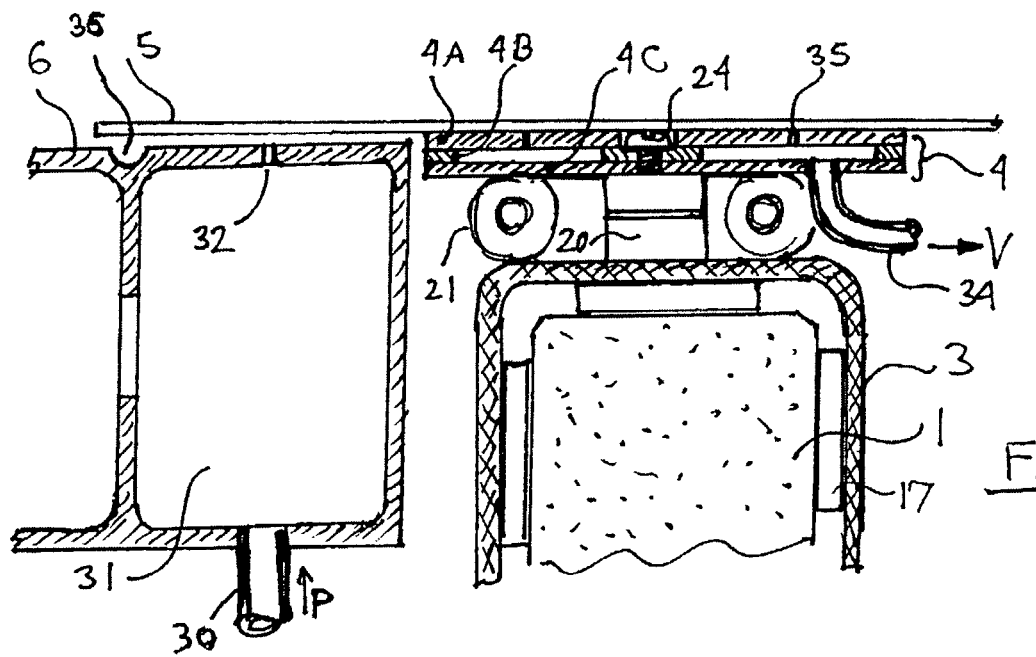
FIG. 5 is an enlarged partial cross-sectional view of the scanner of FIG. 1.

The more detailed view of FIG. 5 shows grooves 36 which allow the air (or other gas) to escape without lifting material 5 any more than necessary. Typically, air pressure inside chamber 31 may be in a range between 2–5 psi and nozzles 32 may be between 2–4 mm in diameter.

Vacuum chuck 4 is preferably fabricated from three plates of carbon fiber composite, as shown in FIG. 5. Top plate 4A comprises a plurality of small apertures 35 which allow the vacuum to securely grip material 5. Bottom plate 4C comprises mounting holes through which fasteners 24 mount chuck 4 onto table 3, as described above. Bottom plate 4C also comprises a vacuum connection 34. Middle plate 4B has openings formed therethrough to distribute the vacuum to apertures 35. The three plates 4A, 4B, and 4C are bonded together by an adhesive such as epoxy resin, to form a stiff, lightweight vacuum chuck 4.

In one particular embodiment, vacuum chuck 4 has dimensions of 150×1000×9 mm, and is made of three plates 4A, 4B 4C of carbon fiber composite, each of which is 3 mm thick. As may be seen in FIG. 2, vacuum chuck 4 extends longitudinally (i.e. in a direction parallel with the fast scan axis) past table 3. This allows clearance between table 3 and supports 2 and allows table 3 to be moved along the entire fast scan axis.

The operation of the scanner is briefly explained with reference to FIG. 1. The description provided herein relates to the use of the scanner in the fabrication of a FPD. Those skilled in the art will appreciate that other applications may involve slightly different operation of the scanner.

A glass sheet of material 5 is positioned on vacuum chuck 4. The initial alignment of material 5 on chuck 4 may be aided by mechanical stops or electronic means, such as a CCD camera. Once positioned and aligned, vacuum is applied to chuck 4 and is transmitted to material 5 through apertures 35 to secure material 5 on the surface of chuck 4. Pressurized air (or other gas) is then applied to air bearing support surfaces 6 to provide flotation to the transversely overhanging portions of material 5. Preferably, material 5 floats about 0.05 mm above air bearing support surfaces 6. For this reason, the top surface of vacuum chuck 4 is preferably positioned about 0.05 mm higher than the height of air bearing support surfaces 6, so that material 5 is maintained in a flat condition.

Air (or other gas) pressure of 40 to 80 psi is applied to the air bearing pads 17 of table 3. This pressure provides a slight outward stretching of the dimensions of table 3 and creates a corresponding air gap of about 0.005 mm between pads 17 and beam 1. This air gap permits table 3 to run freely on beam 1. Under these conditions, motor 8 reciprocably drives table 3 using belt 7 and pulleys 10, 31, to move material 5 forward and backward along the fast scan axis. Similarly, air (or other gas pressure) is also applied to the apertures of air bearing beam 11 to provide a small air gap for sleeve 13. Linear motor 15 moves sleeve 13 and optical scanning head 14 to the desired position along the cross scan axis.

Prior to performing any operation (i.e. such as imaging, for example), a second alignment procedure may be performed using reference indicia (not shown) provided on material 5. Such indicia may be targets such as engraved cross marks or may be one or more edges of material 5. As a part of this second alignment procedure, material 5 and optical scanning head 14 are moved over two or more indicia separated in the fast scanning axis and the rotation of vacuum chuck 4 is adjusted as described above about flexure pivot 20 to bring material 5 into accurate alignment with the fast scanning axis.

Typically, in FPD fabrication, material 5 has been sensitized by applying a coating layer to the surface. In such embodiments, the flatbed scanner may be used to apply patterning radiation. However, this process may vary considerably depending on the application and materials in use.

In order to scan the patterning radiation over the surface of material 5, table 3 is reciprocated back and forth along the fast scanning axis, while optical head 14 emits a beam, or multiple beams, of patterning radiation. The beams are switched on and off in response to imaging data which defines the pattern to be imparted to material 5.

Following each movement along the fast axis, optical scanning head 14 is indexed along the cross scan axis so that during the next motion along the fast scan axis, a new area of material 5 is patterned. Additionally or alternatively, optical scanning head 14 may be indexed to allow interleaving of the patterning radiation according to the particular configuration of the radiation sources on optical scanning head 14. In this manner, the entire surface of material 5 is patterned. The vacuum supply to chuck 4 may then be interrupted and material 5 may be removed from the scanner for further processing.

Figure 6:
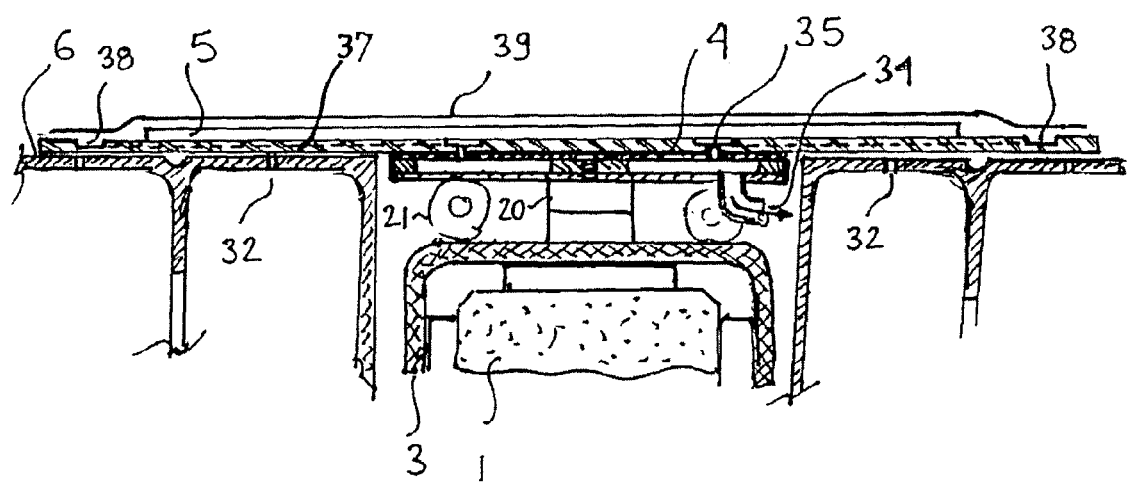
FIG. 6 is a partial cross-sectional view of an alternative embodiment of the scanner according to the present invention.

In an alternative embodiment, it may be required to accommodate a cover sheet in intimate contact with material 5 (for example, when using a donor sheet for the purpose of thermal transfer patterning). In FIG. 6, a carrier plate 37 is attached to vacuum chuck 4. Carrier plate 37 is larger than the sheet of material 5. Carrier plate 37 comprises vacuum holes 35 which penetrate carrier plate 37 and are connected to a plurality of vacuum grooves 38. Vacuum grooves 38 run along the periphery of carrier sheet 37 and serve to draw down a donor sheet 39 by evacuating the space between donor sheet 39 and carrier plate 37.

Additional grooves (not shown) may also run under material 5 to secure material 5 to carrier plate 37. Such additional grooves may be connected to the same vacuum supply as the peripheral vacuum grooves 38 or to a different vacuum supply. Advantageously, separating the vacuum supply allows material 5 to be positioned and secured before applying donor sheet 39 and also allows convenient application of subsequent donor sheets should more than one donor be necessary in a particular process. The patterning then takes place in a similar manner to that previously described except that the patterning radiation is operative to transfer material from the donor sheet to the surface of material 5.

In another embodiment, carrier sheet 37 is used for material 5 that is not sufficiently rigid or sufficiently flat for successful scanning without additional support. Carrier sheet 37 may then be used to impart the required stiffness or flatness to material 5. Such a need may arise in the scanning of printed circuit boards or other materials that are not sufficiently stiff to be supported by air flotation alone.

Another alternative involves the provision of additional vacuum holes on the underside of carrier sheet 37. In operation, the vacuum applied via apertures 35 may also be applied to the holes on the underside of carrier sheet 37, thus providing additional pull down force between air bearing surfaces 6 and carrier sheet 37. Similarly, if a carrier sheet 37 is always used on a particular system, the air (or other gas) supply to air bearing surfaces 6 may be dispensed with in favour of an air supply to carrier sheet 37 via a second set of holes for supplying air (or other gas), instead of supplying vacuum. Another method of increasing the stiffness of carrier sheet 37 may involve the use of magnets which pull down to air bearing surface 6.

As will be apparent to those skilled in the art in the light of the foregoing disclosure, many alterations and modifications are possible in the practice of this invention.

In particular, multiple optical heads 14 may be used on the same cross scan beam 11. Optical head(s) 14 may also be provided with a means for vertical motion if required for purposes of focusing or other operations. Table 3 may be powered by a brushless linear motor or other actuation mechanism instead of the belt drive system described. Table 3 as described is made from a carbon-fiber based composite material, but may also be made from other materials having relatively high specific stiffness such as fiber reinforced aluminium, aluminium foam or magnesium, for example.

Optical scanning head 14 may be a read head or a write head or both. While air bearings are shown in the described embodiments, other forms of a non-contacting bearing may be used such as fluidic or magnetic bearings. Air bearing pads 17 may also be made from carbon fiber composite. In the embodiment depicted in FIG. 6, grooves 36 may be connected to a vacuum system to pull down material 5 in order to load the air bearings created by nozzles 32.

Alternatives for air flotation systems are also known in the art. While the air bearing surfaces described above are configured for atmospheric release of injected air (or other gas), it is also possible to provide a second plurality of ports, connected to a vacuum, to provide a stiffer support for material 5.

What is claimed is:

1. An apparatus for moving a material along a scan axis of a flatbed scanner, the apparatus comprising:
   an elongate table adapted to be driven in a reciprocating manner in a direction aligned with the scan axis, the table having a chuck for securing the material to the table such that the material moves with the table during movement of the table along the scan axis and at least one portion of the material laterally overhangs the table in at least one direction extending transversely to the scan axis; and
   a stationary support surface disposed under the at least one overhanging portion and having a plurality of ports for providing air bearing flotation to the at least one overhanging portion during movement of the table along the scan axis relative to the stationary support surface.

2. The apparatus of claim 1, wherein the material laterally overhangs the table on both sides thereof.

3. The apparatus of claim 1, comprising a plurality of grooves formed in the stationary support surface adjacent to the plurality of ports for permitting escapement of gas.

4. The apparatus of claim 1, wherein the plurality of ports comprise a first plurality of ports connected to a source of pressurized gas, the first plurality of ports interspersed with a second plurality of ports connected to a vacuum source.

5. The apparatus of claim 1, comprising means for rotationally adjusting an alignment of the chuck with respect to the scan axis.

6. The apparatus of claim 1, wherein the chuck comprises a chuck support surface for engaging the material from an underside thereof, the chuck support surface substantially parallel to the stationary support surface but spaced apart therefrom.

7. The apparatus of claim 6, wherein the chuck support surface comprises a plurality of ports which are connected to a vacuum source for securing the material to the chuck support surface.

8. The apparatus of claim 1, wherein the table is slideably mounted on a beam, the beam extending in a direction substantially parallel with the scan axis.

9. The apparatus of claim 8, wherein the table is supported on the beam using a plurality of air bearing pads connected to a source of pressurized gas.

10. The apparatus of claim 1 comprising an intermediate carrier plate for supporting the material, the carrier plate having first and second surfaces, the first surface attached to the table such that at least one portion of the carrier plate overhangs the table, the second surface adapted to secure the material thereto.

11. The apparatus of claim 10, comprising a plurality of ports formed in the second surface, the ports coupled to a vacuum source for securing the material to the second surface.

12. The apparatus of claim 10, wherein the carrier plate is sized larger than the material so that a donor sheet placed over the material contacts the carrier plate around a peripheral region of the second surface and the carrier plate further comprises at least one vacuum port in the peripheral region for establishing a suction force between the donor sheet and the carrier plate to draw the donor sheet into intimate contact with the material.

13. The apparatus of claim 12, wherein the at least one vacuum port in the peripheral region comprises at least one groove running around the peripheral region of the carrier plate.

14. An apparatus for scanning a scan axis of a material in a flatbed scanner, the apparatus comprising:
   an elongate table adapted to be driven in a reciprocating manner in a direction aligned with the scan axis, the table having a chuck for securing the material to the table such that at least one portion of the material laterally overhangs the table; and
   for each overhanging portion of the material, a stationary support surface disposed under the overhanging portion and having a plurality of ports for providing air bearing flotation to the overhanging portion; and
   a belt coupled to the table and extending between at least two pulleys, the pulleys spaced apart along the scan axis and at least one of the pulleys having a drive motor coupled thereto, the motor operative to reciprocatably drive the table in a direction aligned with the scan axis.

15. The apparatus of claim 14, wherein the belt is fabricated from steel.

16. A flatbed scanner for scanning a flat material, the scanner comprising:
   an elongate beam extending parallel to a scan axis;
   a reciprocatable table slideably mounted on the elongate beam via a plurality of air bearing pads and having an engaging surface for securing the material such that the material reciprocates with the table and at least one portion of the material laterally overhangs the engaging surface in at least one direction extending transversely to the scan axis;
   a stationary support surface positioned in fixed vertical relation to the elongate beam, the stationary support surface having a plurality of ports for creating an air bearing to support the at least one overhanging portion during movement of the table along the scan axis relative to the stationary support surface;
   a cross beam supported to extend transversely to the scan axis; and
   a scanning head mounted for movement along the cross beam.

17. A method for moving a flat material along a scan axis of a flatbed scanner, the method comprising:
securing the material to a table using only a portion of a surface area of the material so that there is at least one portion of the material that laterally overhangs the table in a direction extending transversely to the scan axis;
supporting the at least one overhanging portion using an air bearing; and
while supporting the at least one overhanging portion using the air bearing, moving the material along the scan axis by reciprocatably moving the table in directions aligned with the scan axis.

18. The method of claim 17, comprising providing a scanning head and moving the scanning head relative to the material in a cross scan direction generally orthogonal to the scan axis.

19. An apparatus for moving a material along a scan axis a flatbed scanner, the apparatus comprising:
an elongate table adapted to be driven in a reciprocating manner in a direction aligned with the scan axis, the table having a chuck for securing the material to the table such that the material moves with the table during movement of the table along the scan axis and at least one portion of the material extends laterally beyond an edge of the table in a direction extending transversely to the scan axis; and
a stationary support surface disposed substantially parallel to the at least one laterally extending portion and having a plurality of ports for providing an air bearing between the at least one laterally extending portion and the stationary support surface during movement of the table along the scan axis relative to the stationary support surface.

20. An apparatus according to claim 19, wherein the table is slideably mounted on a beam, the beam extending in a direction aligned with the scan axis.

21. An apparatus according to claim 19, wherein the material extends laterally beyond edges of the table on both sides thereof.

22. An apparatus according to claim 19, comprising a plurality of grooves formed in the stationary support surface adjacent to the plurality of ports for permitting escapement of gas.

23. An apparatus according to claim 19, wherein the ports comprise a first plurality of ports connected to a source of pressurized gas, the first plurality of ports interspersed with a second plurality of ports connected to a vacuum source.

24. An apparatus according to claim 19, comprising an intermediate carrier plate for supporting the material, the carrier plate having first and second surfaces, the first surface attached to the table such that at least one portion of the carrier plate extends laterally beyond an edge of the table, the second surface comprising one or more ports coupled to a vacuum source for securing the material thereto.

25. An apparatus according to claim 19, comprising means for rotationally adjusting an alignment of the chuck with respect to the scan axis.

26. An apparatus according to claim 19, wherein the chuck comprises a chuck support surface for engaging a support portion of the material, the chuck support surface substantially parallel to the stationary support surface but spaced apart therefrom.

27. An apparatus according to claim 26, wherein the chuck support surface comprises a plurality of ports which are connected to a vacuum source for securing the support portion of the material to the chuck support surface.

28. An apparatus for scanning a scan axis of a material in a flatbed scanner, the apparatus comprising:
an elongate table adapted to be driven in a reciprocating manner in a direction aligned with the scan axis, the table having a chuck for securing the material to the table such that at least one portion of the material extends laterally beyond an edge of the table; and
for each laterally extending portion of the material, a stationary support surface disposed substantially parallel to the laterally extending portion and having a plurality of ports for providing an air bearing between the laterally extending portion and the stationary support surface; and
a belt coupled to the table and extending between at least two pulleys, the pulleys spaced apart along the scan axis and at least one of the pulleys having a drive motor coupled thereto, the motor operative to reciprocatably drive the table in a direction aligned with the scan axis.

29. A flatbed scanner for scanning a flat material, the scanner comprising:
an elongate beam extending parallel to a scan axis;
a reciprocatable table slideably mounted on the elongate beam, the table having an engaging surface for securing the material such that the material reciprocates with the table and at least one portion of the material extends laterally beyond an edge of the engaging surface in at least one direction extending transversely to the scan axis;
a stationary support surface positioned in fixed vertical relation to the elongate beam, the stationary support surface having a plurality of ports for creating an air bearing to support the at least one laterally extending portion during movement of the table along the scan axis relative to the stationary support surface;
a cross beam supported to extend transversely to the scan axis; and
a scanning head mounted for movement along the cross beam.

30. An apparatus for moving a material along a scan axis of flatbed scanner, the apparatus comprising:
a table that is reciprocatably moveable along the scan axis, the table having a generally planar support surface for receiving a material to be scanned such that the material moves with the table during movement of the table along the scan axis, the table having at least one table edge that is generally parallel to the scan axis and the table sized such that when the material is received thereon, at least one portion of the material extends beyond the at least one table edge in a direction transverse to the scan axis;
a stationary support surface having a support surface edge which is generally parallel to the scan axis and which is located proximate to the at least one table edge, the stationary support surface comprising a plurality of ports for providing an air bearing between the stationary support surface and the at least one overhanging portion of the material during movement of the table along the scan axis relative to the support surface.

31. An apparatus according to claim 30 wherein the table comprises first and second table edges that are generally parallel to the scan axis and the table is sized such that when the material is received thereon, first and second portions of the material extend beyond the first and second table edges in first and second directions transverse to the scan axis and wherein the apparatus comprises first and second stationary support surfaces having first and second support surface edges which are generally parallel to the scan axis and which are respectively located proximate to the first and second table edges, the first and second stationary support surfaces each comprising a plurality of ports for providing first and second air bearings between the first and second stationary support surface and the first and second overhanging portions of the material during movement of the table along the scan axis relative to the first and second support surfaces.

* * * * *